Nov. 29, 1966 L. VIDALI 3,287,823
DISC DRYING APPARATUS FOR MEAL OR POWDERS OF VARIOUS KINDS
Filed July 17, 1963

INVENTOR:
LIVIO VIDALI

United States Patent Office 3,287,823
Patented Nov. 29, 1966

3,287,823
DISC DRYING APPARATUS FOR MEAL OR POWDERS OF VARIOUS KINDS
Livio Vidali, 7 Piazza dell'Unita, Trieste, Italy
Filed July 17, 1963, Ser. No. 295,655
6 Claims. (Cl. 34—173)

The present invention relates to a system of machinery suitable for drying meal or powders of various kinds with an excessive moisture-content.

It is known that before the grain is ground it is desirable for it to be adequately humidified, so that recently ground farinaceous substances are invariably moist, and it is therefore these substances in particular that have to be dehydrated if it is desirable to render them capable of being conserved for an indefinite period. To ensure this result by practical means, with sufficient speed and without the risk of damage to the meal itself, a suitable apparatus has been designed, and this is described hereunder and forms the subject of the present invention.

This plant consists of an assembly of items of apparatus all of which interact in order to provide the aforementioned result and which are as follows: a heater-dryer for the meal, consisting of heated discs with water-circulation and fitted with rotating scrapers which convey the meal from one disc to another; a second dryer and cooler for the meal, likewise consisting of discs but not effecting any heating, the movement of the meal and its passage from one disc to another being ensured, as above, by means of rotating scrapers; a fan with suitable conduits causing air to circulate in a certain manner through the aforementioned two dryers, with the difference that in the first (heater-dryer) the air drawn in is pre-heated by a suitable hot-water heater, with radiant tubes through which the air passes. In the second (the cooler-dryer), on the other hand, the ventilation-air enters the dryer direct and is drawn in by the fan; suitable mechanical devices operating by gears and pulleys set up the rotation in the scrapers on the discs of the two dryers for the movement of the meal from one disc to the other.

Figure 1:
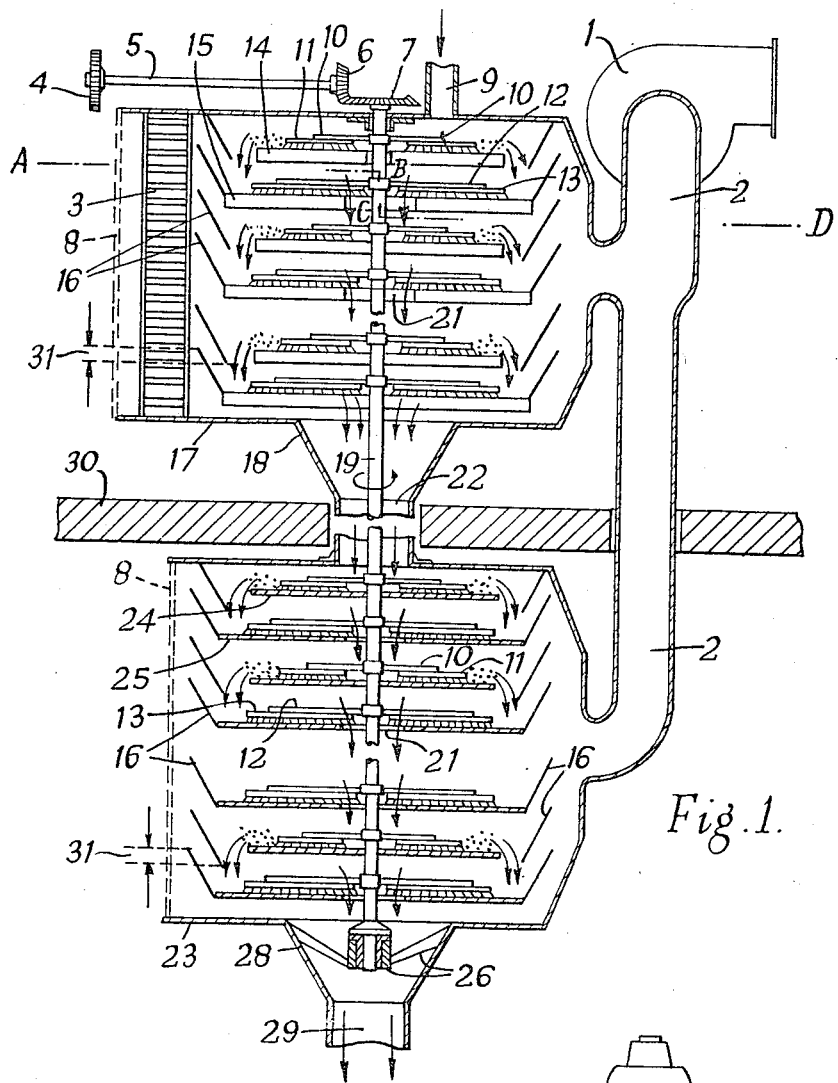
Figure 2:
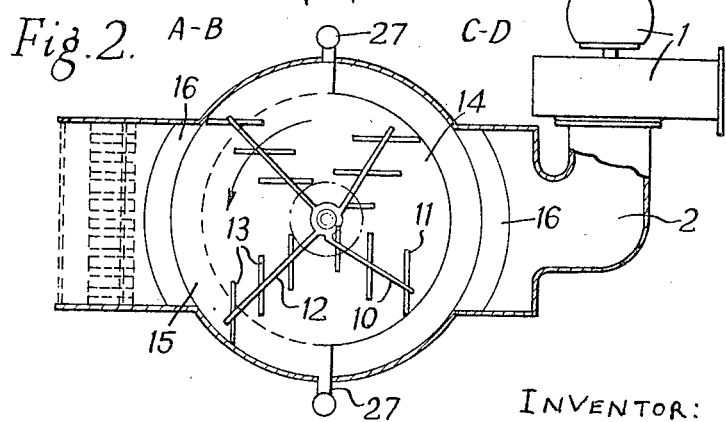

FIG. 1 shows a vertical section of the two dryers with the fan, the ventilation-conduits and the air-heater for the upper dryer. FIG. 2 shows a plan view of the same two dryers, but the left-hand portion, through the section AB, shows the arrangement of the scrapers on the large discs, while the right-hand portion, i.e. the section CD, shows how they are arranged on the small disc.

The particular items of apparatus of which the plant in question consists are as follows:

1 the fan with its electric motor; 2 the cooling-air conduits; 3 the pre-heater for the drying-air, its operation being based on the circulation of hot water; 4, 5, 6 and 7 represent, respectively, the pulley, the transmission-shaft and the relevant pair of bevel gearings for the movement of the vertical shaft 19 of the two dryers; 8 the perforated diaphragm for the external closure of the two dryers, on the air-intake side; 9 the inlet-mouth or tube for the moist meal entering the upper heater-dryer; 10 the arms keyed onto the shaft 19 and bearing the scrapers with brushes 11 which, rotating in the direction shown by the arrows, move the meal on the disc 14 in order to cause it to fall from the external peripheral end of the disc onto the disc 15 immediately below and larger than the former disc (as shown by the small arrow): on the disc 15 the arms 12 rotate in the same direction and likewise bear scrapers with brushes 13, and in this case the rotation of the arms causes the meal lying on the disc to be conveyed to the centre of the latter, where the transfer-orifice 21 is provided, through which orifice the meal falls (as indicated by the small arrows) onto the smaller disc 14 underneath. The meal is thus conveyed onto the discs by the scrapers and caused to fall from disc to disc, first from the inside to the outside and then vice versa the discs 14 and 15, being heated from the inside with hot water in circulation, and irradiating heat, heat the meal in their turn, facilitating the evaporation of the water contained in the latter. The steam, moreover, is easily removed by the circulation of the air produced by the fan 1, this air being likewise heated in advance by the air-heater 3, already mentioned; 16 are screens which serve two purposes: firstly, to cause the meal to be conveyed in stages from disc to disc, through all the discs of which the dryer consists, and secondly, to cause the air taken in by the fan to pass through the individual discs without removing the meal from them; 17 represents the external casing of the upper dryer or heater-dryer; 18 is a collecting-hopper for the meal which falls from the central aperture of the final heating-disc 15, and causes it to fall through the tube 22 into the cooler-dryer situated underneath. This second dryer, of which the purpose is to reduce the moisture in the meal still further, effects the cooling of the meal at the same time. The process is in every way similar to that already described in connection with the upper dryer and differs solely in the absence of any heating, either of the air flowing in direct from the atmosphere or of the actual discs, which are of single steel plating and thus likewise not heated. The meal in this second cooler-dryer takes the same course from disc to disc as described before, the whole of the interior being ventilated with fresh air, and when it leaves the lower hopper 28 and lower tube 29 it will have reached the desired degree of dryness and freshness. The lower support 26 obviously serves to keep the shaft 19 properly centred. As may be seen from the drawing, the discs 24 and 25 of the second dryer are single-walled and not double-walled like the discs 14 and 15 of the upper dryer. The height occupied by a dryer and thus the number of discs of which it consists obviously vary and in any case are considerable, so that it is possible for the two dryers to be installed in two different storeys, one above the other, as shown in the drawings, in which the two dryers are separated by the ceiling 30 of the lower storey. This, however, does not prevent the two dryers, where the height available is sufficient, from being combined together and merely separated by a diaphragm; 27 are the inlet and the outlet pipe, respectively, for the hot water circulating in the discs 14 and 15 of the heater-dryer.

Both the specification and the drawings of the present invention are provided purely by way of information, and any other means of performing the task in question, not involving a departure from the principle of drying the meal by conveying it onto heated discs and causing it to pass from one disc to another disc situated underneath, with air-circulation transversal to the apparatus, forms an integral part of the invention in question.

I claim:

1. Drying apparatus for finely-divided material, such as meal and powders, comprising first and second sets of stationary discs, each set comprising a plurality of discs situated one above the other, means for heating said first set of discs, means contacting said discs to convey said material from each disc to the next lower disc, means for passing a current of heated air across said first set of discs for heating and dehydrating said material, and means for passing a current of air at ambient temperature across said second set of discs for completing the dehydration of and for cooling said material.

2. Drying apparatus according to claim 1, wherein said discs of each set of discs are alternately of greater and lesser diameter, the discs of greater diameter having a central aperture for passage of said material onto a disc of lesser diameter beneath, said means contacting said discs being constituted by brushes mounted on a common vertical shaft and rotatable with respect to said discs, the said brushes contacting each disc of greater diameter being positioned to brush the material towards the centre of the disc, and the said brushes contacting the discs of lesser diameter being positioned to brush the material towards the periphery of the disc.

3. Drying apparatus, as claimed in claim 2 wherein said means for passing a heated current of air across said first set of discs comprises a fan and an air heater, said fan serving also as means for passing a current of air at ambient temperature across said second set of discs.

4. Drying apparatus, as claimed in claim 2 wherein said first and second sets of discs are each positioned in respective first and second housings each having a material inlet and a material outlet, the outlet of the first housing communicating with the inlet of the second housing.

5. Drying apparatus, as claimed in claim 2, comprising adjacent each set of discs a first screening means disposed in the air current upstream of said discs, and a second screening means disposed in the air current downstream of said discs, said screening means serving to prevent the material being blown off the discs.

6. Drying apparatus as claimed in claim 5, wherein there is provided a screen associated with each said disc, the screens associated with an adjacent disc of lesser diameter and the next lower disc of greater diameter overlapping in the axial direction of the discs such that material projected off the periphery of said disc of lesser diameter is deflected by the associated screen onto the disc of greater diameter.

References Cited by the Examiner

UNITED STATES PATENTS 2,144,333   1/1939   Hagen _____ 34—173 X

FOREIGN PATENTS 18,442   1912   Great Britain.

FREDERICK L. MATTESON, JR., *Primary Examiner.*

JOHN J. CAMBY, *Assistant Examiner.*